US010379747B2

(12) United States Patent
Erickson et al.

(10) Patent No.: US 10,379,747 B2
(45) Date of Patent: Aug. 13, 2019

(54) AUTOMATED LATENCY MONITORING (71) Applicant: Western Digital Technologies, Inc., Irvine, CA (US)

(72) Inventors: Mark David Erickson, Mantorville, MN (US); Adam Christopher Geml, Rochester, MN (US); Darin Edward Gerhart, Oronoco, MN (US); Nicholas Edward Ortmeier, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 188 days.

(21) Appl. No.: 14/977,269

(22) Filed: Dec. 21, 2015

(65) Prior Publication Data

US 2017/0177241 A1 Jun. 22, 2017

(51) Int. Cl.
*G06F 3/06* (2006.01)
*G06F 12/08* (2016.01)
*G06F 11/00* (2006.01)

(52) U.S. Cl.
CPC ............ *G06F 3/0611* (2013.01); *G06F 3/061* (2013.01); *G06F 3/0632* (2013.01); *G06F 3/0653* (2013.01); *G06F 3/0655* (2013.01); *G06F 3/0659* (2013.01); *G06F 3/0668* (2013.01); *G06F 3/0685* (2013.01); *G06F 11/00* (2013.01)

(58) Field of Classification Search
CPC ........ G06F 3/0601; G06F 3/0653; G06F 3/06; G06F 3/061; G06F 3/0611; G06F 12/0879; G06F 3/0632; G06F 3/0655; G06F 3/0685

USPC .... 711/102, 103, E12.001, E12.008, E12.04, 711/E12.076, 105, 113; 713/178
See application file for complete search history.

(56) References Cited

U.S. PATENT DOCUMENTS

| 8,327,193 | B2 | 12/2012 | Enarson et al. | |
| 8,332,578 | B2 | 12/2012 | Frickey, III et al. | |
| 9,336,030 | B1* | 5/2016 | Marr | G06F 9/45533 |
| 2005/0021885 | A1* | 1/2005 | Anderson | H04L 1/0061 |
| | | | | 710/29 |
| 2005/0076162 | A1* | 4/2005 | Tamura | G06F 13/387 |
| | | | | 710/20 |
| 2009/0150894 | A1 | 6/2009 | Huang et al. | |

(Continued)

*Primary Examiner* — Tuan V Thai
*Assistant Examiner* — Edward Waddy, Jr.
(74) *Attorney, Agent, or Firm* — Patterson & Sheridan, LLP; Steven Versteeg (57) ABSTRACT A method includes receiving, by a hardware controller of a storage device and from a host device, a command to read data from or write data to a non-volatile memory device of the storage device. The method includes, responsive to receiving the command: initializing, by firmware executing at a processor of the hardware controller, a command to retrieve data from or write data to the non-volatile memory device; determining, by circuit logic of the hardware controller, a time indicative of when the firmware initialized the command; determining, by the circuit logic, a time indicative of when the command terminated; and storing, by the circuit logic and at a latency monitoring cache of the storage device, a timestamp associated with the time indicative of when the command was initialized and a timestamp associated with the time indicative of when the command terminated.

22 Claims, 4 Drawing Sheets (56) References Cited

U.S. PATENT DOCUMENTS

| | | |
|---|---|---|
| 2010/0153656 A1* | 6/2010 | Yoshikawa ......... G06F 12/0859 |
| | | 711/141 |
| 2010/0174849 A1 | 7/2010 | Walston et al. |
| 2013/0124932 A1 | 5/2013 | Schuh et al. |
| 2014/0181585 A1 | 6/2014 | Hoang et al. |
| 2014/0337562 A1 | 11/2014 | Long et al. |
| 2014/0359204 A1* | 12/2014 | Yoo .................... G06F 12/0246 |
| | | 711/103 |
| 2017/0115904 A1* | 4/2017 | Hashimoto ......... G06F 11/0754 |
| 2017/0133011 A1* | 5/2017 | Chen .................. H04L 12/4625 |

* cited by examiner

AUTOMATED LATENCY MONITORING

TECHNICAL FIELD

This disclosure relates to storage devices, such as solid state drives.

BACKGROUND

Solid-state drives (SSDs) may be used in computers in applications where relatively low latency and high capacity storage are desired. For example, SSDs may exhibit lower latency, particularly for random reads and writes, than hard disk drives (HDDs). This may allow greater throughput for random reads from and random writes to a SSD compared to a HDD. Additionally, SSDs may utilize multiple, parallel data channels to read from and write to memory devices, which may result in high sequential read and write speeds. While SSDs generally have a low latency, from time to time, SSDs may experience higher than desired latency. Determining the cause of the higher latency may require recreating the operating conditions of the SSD that existed at the time the SSD experienced the higher than desired latency.

SUMMARY

In one example, a method may include receiving, by a hardware controller of a storage device and from a host device, a command to read data from a non-volatile memory device of the storage device. The method may also include, responsive to receiving the command: initializing, by firmware executing at a processor of the hardware controller, a data retrieval command to retrieve data from the non-volatile memory device; determining, by circuit logic of the hardware controller, a time indicative of when the firmware initialized the data retrieval command; determining, by the circuit logic, a time indicative of when the data retrieval command terminated; and storing, by the circuit logic and at a latency monitoring cache of the storage device, a timestamp associated with the time indicative of when the data retrieval command was initialized and a timestamp associated with the time indicative of when the data retrieval command terminated.

In another example, a data storage device may include a non-volatile memory device and a hardware controller. The hardware controller may include a latency monitoring cache configured to store latency information. The hardware controller may be configured to receive, from a host device, a command to read data from the non-volatile memory device. The hardware controller may also be configured to, responsive to receiving the command: determine a time indicative of initializing a data retrieval command to retrieve data from the non-volatile memory device; determine a time indicative of terminating the data retrieval command; and store, to the latency monitoring cache, a timestamp associated with the time indicative of initializing the data retrieval command and a timestamp associated with the time indicative of terminating the data retrieval command.

In another example, a storage device may include means for means for receiving, by a hardware controller of the storage device, a command to read data from a non-volatile memory device of the storage device. The storage device may include means for initializing, by firmware executing at a processor of the hardware controller, a data retrieval command to retrieve data from the non-volatile memory device. The storage device may also include means for determining, by circuit logic of the hardware controller, a time indicative of when the firmware initialized the data retrieval command. The storage device may further include means for determining, by the circuit logic, a time indicative of when the data retrieval command terminated. The storage device may also include means for storing, by the circuit logic, a timestamp associated with the time indicative of when the data retrieval command was initialized and a timestamp associated with the time indicative of when the data retrieval command terminated.

In another example, a method may include receiving, by a hardware controller of a storage device and from a host device, a command to write data to a non-volatile memory device of the storage device. The method may also include, responsive to receiving the command: initializing, by firmware executing at a processor of the hardware controller, a data storage command to store data to the non-volatile memory device; determining, by circuit logic of the hardware controller, a time indicative of when the firmware initialized the data storage command; determining, by the circuit logic, a time indicative of when the data storage command terminated; and storing, by the circuit logic and at a latency monitoring cache of the storage device, a timestamp associated with the time indicative of when the data storage command was initialized and a timestamp associated with the time indicative of when the data storage command terminated.

The details of one or more examples are set forth in the accompanying drawings and the description below. Other features, objects, and advantages will be apparent from the description and drawings, and from the claims.

DETAILED DESCRIPTION

In general, this disclosure describes techniques for automatically measuring latency in a computing system when writing data to, or reading data from, a data storage device. For example, a controller in the data storage device may be configured to record timestamps associated with certain events while executing a read command. The controller may include circuitry that is configured to record a timestamp when the read command is received, when the read command is executed, and/or when other events associated with the read command occur. The controller may be configured to determine an elapsed amount of time between any of the timestamps and record information about the operating characteristics of the computing system if the elapsed time is greater than a threshold amount of time. The techniques of this disclosure may enable a data storage device to detect a delay in real time and record operating characteristics of the computing system when a delay is detected. In this way, techniques of this disclosure may enable a data storage device to output information for troubleshooting a delay rather than requiring a user to attempt to recreate the operating conditions that triggered the delay.

Figure 1:
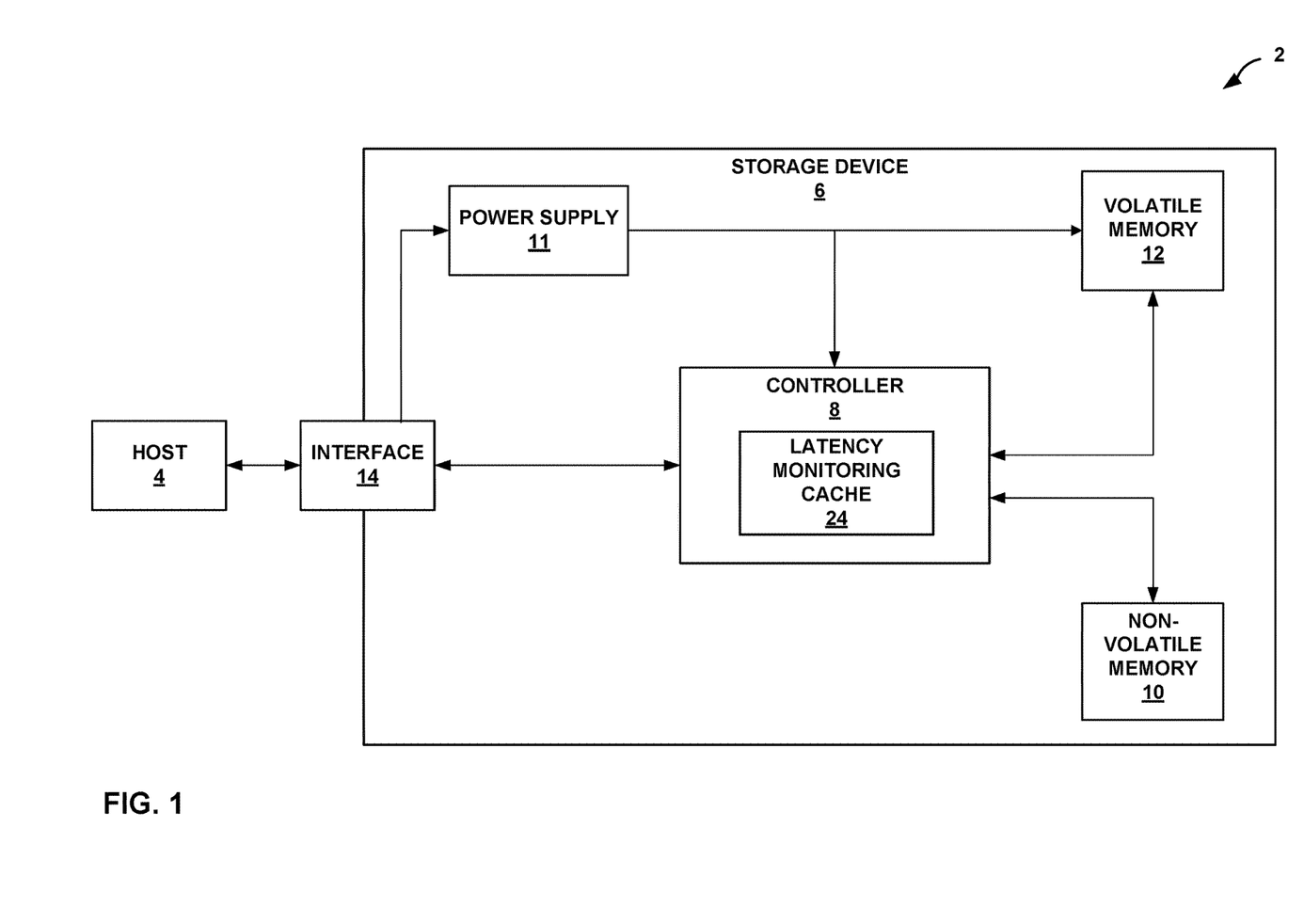
FIG. 1 is a conceptual and schematic block diagram illustrating an example storage environment in which a storage device may function as a storage device for a host device, in accordance with one or more techniques of this disclosure

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), or the like. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4.

For example, as illustrated in FIG. 1, power supply 11 may receive power from host device 4 via interface 14.

Storage device 6 may include NVM 10, which may include a plurality of memory devices. NVM 10 may be configured to store and/or retrieve data. For instance, a memory device of NVM 10 may receive data and a message from controller 8 that instructs the memory device to store the data. Similarly, the memory device of NVM 10 may receive a message from controller 8 that instructs the memory device to retrieve data. In some examples, each of the memory devices may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 10 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 8 may write data to and read data from NAND flash memory devices at the page level and erase data from NAND flash memory devices at the block level.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information in volatile memory 12 until cached information is written to non-volatile memory 10. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 includes controller 8, which may manage one or more operations of storage device 6. For instance, controller 8 may manage the reading of data from and/or the writing of data to non-volatile memory 10.

In some examples, controller 8 may measure latency in storage device 6 and record latency information about storage device 6. For example, if storage device 6 receives a read command from host device 4, controller 8 may initiate a data retrieval command to retrieve data from non-volatile memory 10 and monitor the progress of the data retrieval. In some examples, controller 8 may determine a time indicative of initiating the data retrieval command. For example, controller 8 may determine a time indicative of initiating the data retrieval command by determining a time when controller 8 received the read command from host device 4, began to execute the data retrieval command, or received a first data frame from non-volatile memory 10. In some examples, controller 8 may determine a time indicative of terminating the data retrieval command. For example, controller 8 may determine a time indicative of terminating the data retrieval command by determining a time when controller 8 received a last data frame from non-volatile memory 10, or sent a status frame (e.g., a frame indicating whether the data transfer was successful) to host device 4.

Likewise, if storage device 6 receives a write command from host device 4, controller 8 may initiate a data storage command to store data to non-volatile memory 10 and monitor the progress of the data storage command. In some examples, controller 8 may determine a time indicative of initiating the data storage command. For example, controller 8 may determine a time indicative of initiating the data storage command by determining a time when controller 8 received the write command from host device 4, began to execute the data storage command, or received a first data frame from host device 4. In some examples, controller 8 may determine a time indicative of terminating the data storage command. For example, controller 8 may determine a time indicative of terminating the data storage command by determining a time when controller 8 received a last data frame from host device 4, or sent a status frame (e.g., a frame indicating whether the data transfer was successful) to host device 4.

Controller 8 may store timestamp information associated with the data retrieval command (or data storage command) in latency monitoring cache 24. For example, controller 8 may determine a timestamp associated with the time indicative of initiating the data retrieval command (or data storage command) and may cause the timestamp to be stored in latency monitoring cache 24. Likewise, controller 8 may determine a timestamp associated with the time indicative of terminating the data retrieval command (or data storage command) and may cause the timestamp to be stored in latency monitoring cache 24. In some examples, the granularity of the timestamps stored in latency monitoring cache 24 may be configurable. For example, controller 8 may store timestamp information in increments as small as 10 nanoseconds to increments of 10 microseconds or more.

In some examples, controller 8 may measure latency in storage device 6 based on the timestamps stored in latency monitoring cache 24. For example, controller 8 may determine an elapsed time between two timestamps stored in latency monitoring cache 24 and compare the elapsed time to a threshold amount of time. In response to determining that the elapsed time satisfies a threshold amount of time (e.g., the elapsed time is greater than threshold amount of time), controller 8 may determine at least one operational characteristic of storage environment 2 and cause the at least one operational characteristic of storage environment 2 to be stored to a memory device (e.g., non-volatile memory 10 or volatile memory 12). For example, operational characteristics may include controller register information, firmware data structures, firmware event history, host configured mode settings (e.g., formatted capacity, Power Modes, Encryption Modes, and the like), device state (e.g., amount of drive used, temperature of device, state of SMART parameters, etc.), host command sequence and history, and so on. Examples of firmware data structures may include performance and workload statistics, error statistics, and state information about non-volatile memory (such as amount of valid customer data and amount of memory ready to store new customer data). In some examples, controller 8 may store the operational characteristics in a system area of NVM 10.

In this manner, controller 8 may enable storage device 6 to measure latency in storage environment 2 in real time. By measuring latency information in real time, storage device 6 may detect higher than normal latency and store information about the operational characteristics of storage environment 2 for analysis at a later time. In contrast to traditional latency measuring techniques, which require a user to attempt to recreate a similar computing environment in order to determine the cause of latency, the described techniques may enable storage device 6 to store the latency measurements and actual operation characteristics of storage environment 2 when storage device 6 experiences higher than normal latency. As a result, storage device 6 may output the actual latency measurements and the actual operational characteristics of storage environment 2 so that a user may more easily and more accurately determine the cause of the latency.

Figure 2:
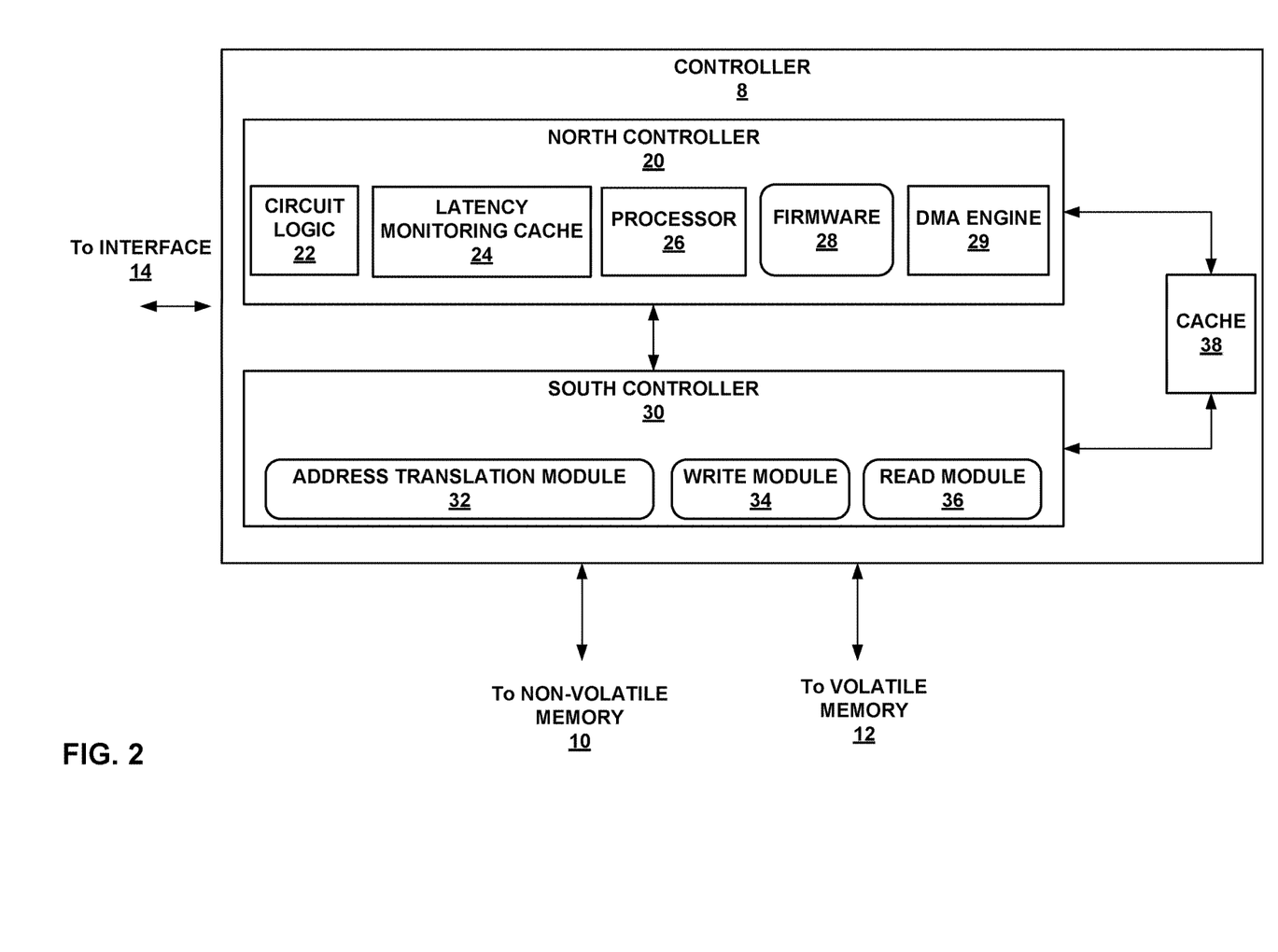
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 is a hardware controller. Hardware controller 8 may include cache 38 and one or more sub-controllers, such north controller 20 and south controller 30. It is to be understood that the terms "north" and "south" do not necessarily describe the physical orientation of sub-controllers 20 and 30, but are merely intended to help the reader understand the disclosure of FIG. 2. In some examples, hardware controller 8 may include additional modules or hardware units, or may include fewer modules or hardware units.

Hardware controller 8 may interface with host device 4 via interface 14 and manage the storage of data to and the retrieval of data from NVM 10 and/or volatile memory 12. For example, north controller 20 may receive a read command from host device 4. Responsive to receiving the read command, north controller 20 may initiate a data retrieval command instructing south controller 30 to retrieve data from NVM 10 and store the data in cache 38. North controller 20 may retrieve the data from cache 38 and send the data to host device 4.

As another example, north controller 20 may receive a write command and corresponding data from host device 4.

Responsive to receiving the write command, north controller 20 may store the received data in cache 38 and initialize a data storage command instructing south controller 30 to store the data in NVM 10. Responsive to receiving the data storage command, south controller 30 may retrieve the corresponding data from cache 38 and store the data in NVM 10.

North controller 20 may include circuit logic 22, latency monitoring cache 24, processor 26, firmware 28, and one or more direct memory access (DMA) engines 29. Circuit logic 22 may include an integrated circuit or discrete logic circuitry. For example, circuit logic 22 may be implemented within one or more application specific integrated circuits (ASICs), field programmable gate arrays (FPGAs), or any other equivalent integrated or discrete logic circuitry, as well as any combinations of such components. Responsive to receiving a command from host device 4, north controller 20 may initialize and send a command (e.g., a data retrieval command or a data storage command) to south controller 30. Circuit logic 22 may determine a time indicative of when north controller 20 initialized the command. For example, circuit logic 22 may determine a time at which north controller 20 received the read/write command, a time at which north controller 20 initialized a data retrieval command or data storage command, or a time at which a first data frame was received. Likewise, circuit logic 22 may determine a time indicative of when the command initialized by north controller 20 has terminated. For example, circuit logic 22 may determine a time at which a last data frame was received or a time at which a status frame was sent.

Latency monitoring cache 24 may include any type of volatile memory device, such as RAM, DRAM, SRAM, SDRAM, or any other type of volatile memory device similar to volatile memory 12. In some examples, latency monitoring cache 24 may store information associated with a data transfer command. For example, latency monitoring cache 24 may store timestamp information associated with certain events related to a read or write command. For instance, latency monitoring cache 24 may store one or more timestamps associated with initializing a data retrieval or data storage command, or one or more timestamps associated with the termination of the data retrieval command or data storage command. For example, the one or more timestamps may be associated with any of the times determined by circuit logic 22, as described above. Because a block of data transferred while executing a data retrieval command or data storage command may be too large to transfer in one contiguous transaction and may be transferred in several smaller bursts, in some examples, latency monitoring cache may store the number of bursts required to complete the read or write command.

Processor 26 may include one or more microprocessors, digital signal processors (DSPs), application specific integrated circuits (ASICs), field programmable gate arrays (FPGAs), or any other equivalent integrated or discrete logic circuitry, as well as any combinations of such components. Processor 26 may execute firmware 28. Firmware 28 may include instructions that, when executed by processor 26, cause processor 26 to initiate a data retrieval command or a data storage command. Firmware 28 may cause processor 26 to send the data retrieval command or data storage command to south controller 30 so that south controller 30 may transfer data between NVM 10 and cache 38. In some examples, firmware 28 includes instructions that, responsive to determining the command has terminated, cause processor 26 to copy information from latency monitoring cache 24 to volatile memory 12 and/or NVM 10. Firmware 28 may include instructions that cause processor 26 to update a data valid flag within latency monitoring cache 24 in response to copying the data from latency monitoring cache 24 to volatile memory 12 or NVM 10. The data valid flag may indicate that the data stored in latency monitoring cache 24 is no longer valid (e.g., because the command associated with the particular data valid flag has terminated and the data has been copied to another memory device) and may be overwritten.

DMA engine 29 may enable hardware controller 8 to transfer data between host device 4 and cache 38 without requiring a CPU to manage the transfer. For example, DMA engine 29 may control a memory bus so that processor 26 may perform other operations while data is transferred between host device 4 and cache 38. Once firmware has assigned a particular DMA engine 29 to execute the data transfer, the particular DMA engine 29 may transfer the data between host device 4 and cache 38.

South controller 30 may include an address translation module 32, write module 34, and read module 36. Write module 34 may communicate with address translation module 32, which manages translation between logical addresses used by host device 4 to manage storage locations of data and physical block addresses used by write module 34 to direct writing of data to memory devices. Address translation module 32 may utilize a flash translation layer or table that translates logical addresses (or logical block addresses) of data stored by NVM 10 to physical block addresses of data stored by NVM 10. For example, host device 4 may utilize the logical block addresses of the data stored by NVM 10 in instructions or messages to storage device 6, while write module 34 may utilize physical block addresses of the data to control writing of data to NVM 10. (Similarly, read module 36 may utilize physical block addresses to control reading of data from NVM 10.) The physical block addresses correspond to actual, physical blocks of NVM 10. In some examples, address translation module 32 may store the flash translation layer or table in volatile memory 12.

In this way, host device 4 may be allowed to use a static logical block address for a certain set of data, while the physical block address at which the data is actually stored may change. Address translation module 32 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 34 may perform one or more operations to manage the writing of data to NVM 10. For example, write module 34 may manage the writing of data to NVM 10 by selecting one or more blocks within NVM 10 to store the data and causing the selected blocks to actually store the data. As discussed above, write module 34 may cause address translation module 32 to update the flash translation layer or table based on the selected blocks. For instance, write module 34 may receive a data storage command from north controller 20 that includes a logical block address, select a block within NVM 10 to store the data from cache 38, cause the selected block to actually store the data, and cause address translation module 32 to update the flash translation layer or table to indicate that the logical block address corresponds to the selected block within NVM 10.

Read module 36 similarly may control reading of data from NVM 10. For example, read module 36 may receive a data retrieval command from north controller 20 requesting data with an associated logical block address. Address translation module 32 may convert the logical block address to a physical block address using the flash translation layer or table. Read module 36 then may retrieve the data from the physical block addresses.

In operation, north controller 20 may receive a data transfer command (e.g., a read command) from host device 4. Responsive to receiving the read command, circuit logic 22 may allocate a row of data in latency monitoring cache 24 for storing information associated with the read command. Circuit logic 22 may update a data valid flag within latency monitoring cache 24 to indicate that the row of data includes valid data associated with an active read command. Further responsive to receiving the read command, circuit logic 22 may send a signal to firmware 28 indicative of the read command. In some examples, firmware 28 may initialize a data retrieval command and prepare for a data transfer between NVM 10 and host device 4. For example, firmware 28 may include instructions causing processor 26 to perform protocol checks and assign a DMA engine to transfer data between host device 4 and cache 38.

In some examples, circuit logic 22 may determine a time indicative of when firmware 28 initialized the data retrieval command and store a timestamp associated with the time indicative of when the data retrieval command was initialized. For example, the time at which hardware controller 8 received the read command may be indicative of the time at which firmware 28 initialized the data retrieval command. In some examples, circuit logic 22 may determine a time at which circuit logic 22 received the read command from host device 4, determine a timestamp associated with the time at which circuit logic 22 received the read command, and store the timestamp to latency monitoring cache 24.

After initializing the data retrieval command, firmware 28 may send the data retrieval command to south controller 30. Responsive to south controller 30 receiving the data retrieval command, read module 36 may retrieve data from NVM 10 and store the data in cache 38.

In some examples, circuit logic 22 may determine a time indicative of when firmware 28 initialized the data retrieval command by determining a time at which firmware 28 began to execute to the data retrieval command. Circuit logic 22 may determine a timestamp associated with the time at which firmware 28 began to execute the data retrieval command and store the timestamp to latency monitoring cache 24.

Firmware 28 may assign a DMA engine 29 to transfer data between cache 38 and host device 4. Once at least a portion of the data has been stored to cache 38, the DMA engine 29 assigned by firmware 28 may transfer the data from cache 38 to host device 4. In some examples, the time at which the first data frame is transferred between cache 38 and host device 4 may indicate when firmware 28 initialized the data retrieval command. Thus, circuit logic 22 may determine a time at which north controller 20 received a first data frame from cache 38, determine a timestamp associated with the time at which north controller 20 received the first data frame from cache 38, and store the timestamp to latency monitoring cache 24.

DMA engine 29 may transfer data between cache 38 and host device 4 until all of the data requested by the host device 4 has been transferred to host device 4. For example, read module 36 of south controller 30 may continue to retrieve data from NVM 10 and store the data to cache 38, such that DMA engine 29 may transfer the data from cache 38 to host device 4.

DMA engine 29 may transfer data between cache 38 and host device in bursts. For example, while executing a read command, DMA engine 29 may open a connection with host device 4, send one or more data frames from cache 38 to device 4, and close the connection to host device 4. One burst may include the sequence of events where DMA engine 29 opens a connection, sends data, and closes the connection. In some examples, DMA engine 29 may not be able to transfer all of the data frames before closing the connection to host device 4 (e.g., a resource limitation may prevent DMA engine 29 from transferring all of the data in a single transaction). In some instances, circuit logic 22 may count the number of bursts (i.e., the number of open to close sequences required to transfer all of the data) and store the number of bursts in latency monitoring cache 24 once all of the data has been transferred between cache 38 and host device 4. In other instances, circuit logic 22 may increment a burst counter within latency monitoring cache 24 each time DMA engine 29 opens or closes a connection with host device 4.

In some examples, circuit logic 22 may determine a time indicative of when the data retrieval command terminated. For example, the time at which hardware controller 8 receives a last data frame may be indicative of when the data retrieval command terminated. Thus, circuit logic 22 may determine the time at which DMA engine 29 received the last data frame from NVM 10 (via cache 38). Circuit logic 22 may determine a timestamp associated with the time at which DMA engine 29 received the last data frame and store the timestamp to latency monitoring cache 24. In some examples, the time at which DMA engine 29 sent a status frame to host device 4 (e.g., a frame indicating whether the transfer was successful) may be indicative of when the data retrieval command terminated. In these examples, circuit logic 22 may determine a timestamp associated with the time at which DMA engine 29 sent the status frame and may store the timestamp to latency monitoring cache 24.

North controller 20 may determine an elapsed time between any two of the events described above. The elapsed time may be determined by circuit logic 22 or by firmware 28. In some examples, north controller 20 may determine the elapsed time between a time indicative of when the firmware initialized the data retrieval command and a time indicative of when the data retrieval command terminated. For example, circuit logic 22 may include a timer to determine the elapsed time between the time at which the north controller 20 received the read command from host device 4 and the time at which north controller 20 sent the status frame to host device 4. Likewise, north controller 20 may determine an elapsed time between a first and second time indicative of when the firmware initialized the data retrieval command or an elapsed time between a first and second time indicative of when the data retrieval command terminated. For example, firmware 28 may determine an elapsed time based on the timestamps stored in latency monitoring cache 24.

North controller 20 may determine whether the elapsed time satisfies a threshold amount of time (e.g., is greater than a threshold amount of time). In some examples, the threshold amount of time may be predetermined. For instance, the threshold amount of time may be 20 milliseconds. However, in some examples, the threshold amount of time may be selectable (in other words, the threshold time may be set by a user). For example, the default threshold amount of time may be 20 milliseconds but a user may select a threshold time between 5 milliseconds and 100 milliseconds (or more) depending on the user requirements. In some examples, north controller 20 may include more than one threshold time. For example, the threshold amount of time for a read command may be different than the threshold amount of time for a write command. Responsive to determining that the elapsed time satisfies the threshold amount of time, north controller 20 may determine one or more operational characteristics of storage environment 2 and may store information about the operational characteristics to a system area of NVM 10.

In some examples, hardware controller 8 may copy data from latency monitoring cache 24 to volatile memory 12. For example, hardware controller 8 may copy data from latency monitoring cache 24 to a firmware only portion of volatile memory 12. Likewise, hardware controller 8 may copy the latency information from latency monitoring cache 24 directly to NVM 10, or may copy the latency information to volatile memory 12 and then from volatile memory 12 to NVM 10. In some examples, firmware 28 may create reports (e.g., a histogram) based on the latency information and may store the reports to volatile memory 12 or NVM 10.

In some examples, hardware controller 8 may update the latency information associated with a particular data retrieval command in response to copying the particular latency information to another memory device. For example, after copying the latency information associated with a particular data retrieval command from latency monitoring cache 24 to another memory device (e.g., NVM 10 or volatile memory 12), firmware 28 may update latency monitoring cache 24 by setting the timestamps associated with a particular data retrieval command cache 24 to a default vale (e.g., "n/a", all zeroes, or the like). However, in some examples, firmware 28 may refrain from setting the timestamps associated with a particular row of data and circuit logic 22 may set the timestamps to a default value when circuit logic 22 re-allocates the particular row to a subsequent command. Firmware 28 may update the data valid flag within latency monitoring cache 24 to indicate that the data is no longer valid and may be overwritten (e.g., because the data retrieval command has terminated and that the data within latency monitoring cache 24 associated with the particular data retrieval command has been copied to another memory device).

While the above disclosure describes techniques for measuring latency with respect to a read command, the techniques may also apply to measuring latency with respect to a write command. For example, host device 4 may send a write command to storage device 6. Responsive to hardware controller 8 receiving the write command from host device 4, circuit logic 22 may allocate a row of data in latency monitoring cache 24 for storing information associated with the write command. Circuit logic 22 may update a data valid flag within latency monitoring cache indicating that the data within latency monitoring cache 24 associated with the write command is valid.

Firmware 28 may initialize a data storage command and assign a DMA engine 29 to transfer data between host device 4 and cache 38. DMA engine 29 may transfer data from host device 4 to cache 38. Firmware 28 may send the data storage command to south controller 38 such that south controller 30 may retrieve data from cache 38 and store the data to NVM 10.

Circuit logic 22 may determine a time indicative of when the firmware initialized the data storage command. For example, circuit logic 22 may determine a time at which the write command was received, a time at which firmware 28 initialized the data storage command, and/or a time at which the first data frame was received by north controller 20. Circuit logic 22 may determine a time indicative of when the data storage command terminated. For example, circuit logic 22 may determine a time at which the last data frame was received by north controller 20 and/or a time at which a status frame was sent by north controller 20. Circuit logic 22 may determine one or more timestamps associated with any of the times described above and may store the timestamps to latency monitoring cache 24.

Hardware controller 8 may determine an elapsed time between a first time and a second time of the times determined by circuit logic 22. Hardware controller 8 may determine whether the elapsed time satisfies a threshold amount of time. If hardware controller 8 determines that the elapsed time satisfies a threshold amount of time, hardware controller 8 may determine one or more operational characteristics of storage environment 2. Hardware controller 8 may copy latency information from latency monitoring cache 24 to volatile memory 12 and/or NVM 10.

Figure 3:
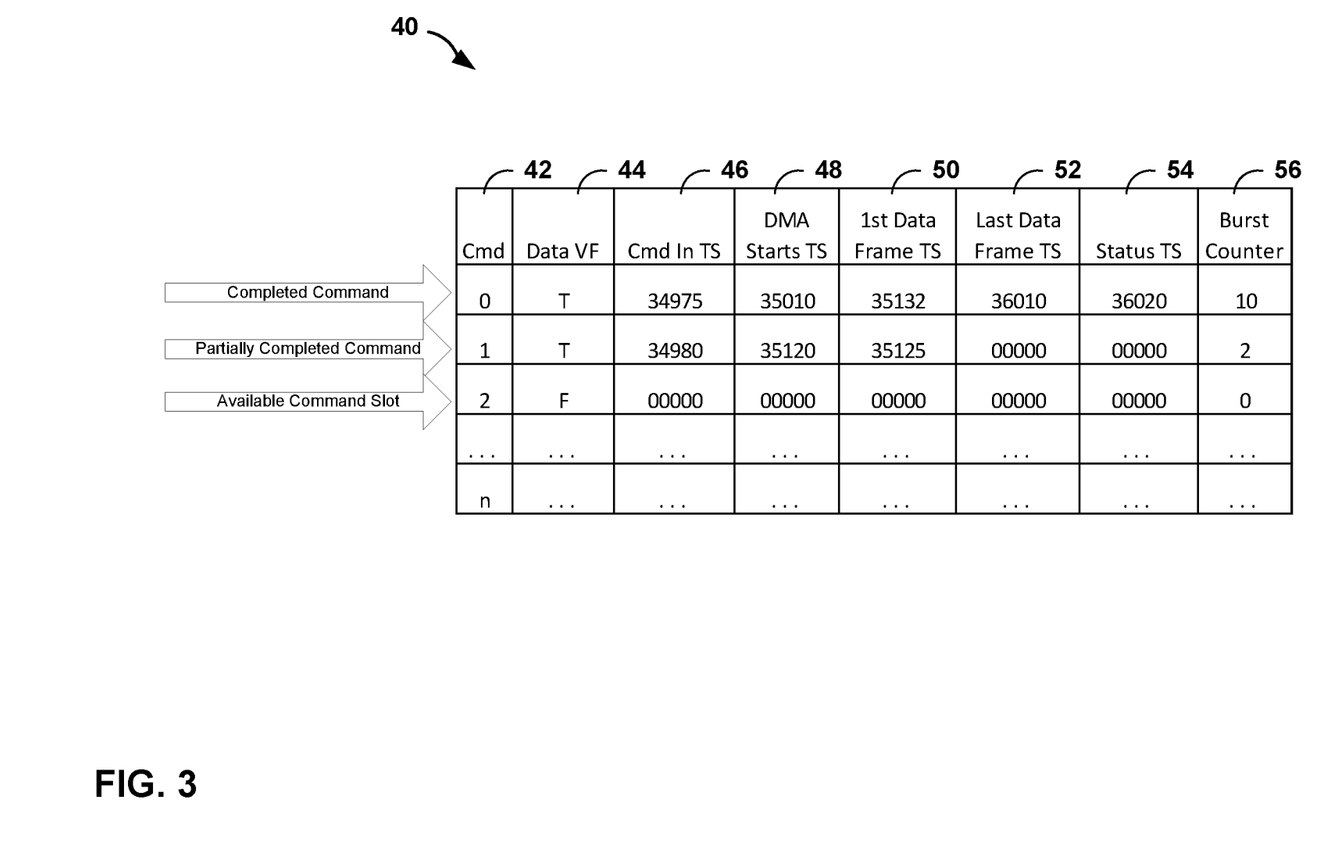
FIG. 3 is a conceptual and schematic block diagram illustrating example details of a data structure used to store latency information within a latency monitoring cache, in accordance with one or more techniques of this disclosure.

FIG. 3 is a conceptual and schematic block diagram illustrating example details of a data structure use to store latency information within a latency monitoring cache, in accordance with one or more techniques of this disclosure. For ease of illustration only, the data structure will be described as a latency information table 40. However, the latency information may be stored in any type of data structure. For purposes of illustration, the latency information table 40 will be described with reference to FIGS. 1 and 2.

Latency information table 40 may store latency information associated with one or more commands initialized by firmware 28 (e.g., data retrieval command(s) and/or data storage command(s)). For example, latency information table 40 may include N rows of data and each row of data may be associated with a respective firmware command. Each row may include a plurality of columns.

In some examples, latency information table 40 may include the columns "Cmd" 42, "Data VF" 44, "Cmd In TS" 46, "DMA Starts TS" 48, "$1^{st}$ Data Frame TS" 50, "Last Data Frame TS" 52, "Status TS" 54, and "Burst Counter" 56. "Cmd" 42 may include a unique identifier to identify the row of data associated with the firmware command. "Data VF" 44 may include a data valid flag that may identify whether the data associated with the firmware command (i.e., the data stored in row-0) is valid. For example, a value of "T" in Data VF 44 may indicate the data stored in row-0 is valid while a value of "F" in Data VF 44 may indicate that the data stored in row-2 is not valid (e.g., because no information is stored in row-2 or the command associated with row-2 has terminated and the data has been copied to another location).

Column "Cmd in TS" 46 may include a timestamp associated with the time at which hardware controller 8 received a read or write command that caused firmware 28 to initialize the data retrieval command or data storage command. Column "DMA Starts TS" 48 may include a timestamp associated with the time at which hardware controller 8 began to execute the data retrieval command or data storage command. Column "$1^{st}$ Data Frame TS" 50 may include a timestamp associated with the time at which the first data frame corresponding to the data retrieval or data storage command was transferred between host device 4 and hardware controller 8. In some examples, columns "Cmd in TS" 46, "DMA Starts TS" 48, and "$1^{st}$ Data Frame TS" 50 may be indicative of a time when firmware 28 initialized a data retrieval command or data storage command.

Column "Last Data Frame TS" 52 may include a timestamp associated with the time at which the last data frame associated with the data retrieval or data storage command was transferred between host device 4 and hardware controller 8. Column "Status TS" 54, which may include a timestamp associated with the time at which hardware controller 8 sent a status frame indicating whether the data transfer was successful. Column "Burst Counter" 56 may be used to count the number of bursts required to transfer all of the data associated with the respective command. In some examples, columns "Last Data Frame TS" 52 and "Status TS" 54 may be indicative of a time when the data retrieval command or data storage command terminated.

In operation, hardware controller 8 may receive a command (e.g., a read command or a write command) from host device 4 and circuit logic 22 may allocate a row in latency monitoring cache 24 for storing latency information associated with the command. For example, circuit logic 22 may allocate the first row of latency monitoring cache 24, which is identified by the value "0" in column "Cmd" 42. Circuit logic 22 may set "Data VF" 44 to "T" for true, indicating that the data stored in row-0 is valid. In some examples, circuit logic 22 may determine a time at which the command was received and store an associated timestamp in "Cmd In TS" 46. Firmware 28 may initialize a data retrieval command or a data storage command, assign a DMA engine 29 to transfer data between cache 38 and host device 4, and send the data retrieval command or data storage command to south controller 30. Circuit logic 22 may determine a time when firmware 28 began to execute the data retrieval command or data storage command and may store an associated timestamp in "DMA Starts TS" 48. Responsive to north controller 20 receiving the first data frame (e.g., from NVM 10 (via cache 38) for a data retrieval command or from host device 4 for a data storage command), circuit logic 22 may determine a time when north controller 20 received the first data frame and may store an associated timestamp in "$1^{st}$ Data Frame TS" 50.

Circuit logic 22 may determine a time at which north controller 20 received a last data frame and may store an associated timestamp in "Last Data Frame TS" 52. Likewise, circuit logic 22 may determine a time at which north controller 20 sent a status frame and may store an associated timestamp in "Status TS" 54.

Hardware controller 8 may determine an elapsed time between any two of the timestamps stored in latency monitoring cache 24. The elapsed time may be indicative of a particular source of latency in storage environment 2. For example, the elapsed time between the timestamps stored in columns "Cmd in TS" 46 and "DMS Starts TS" 48 may represent the amount of time between when a command was received from host device 4 and when firmware 28 began to execute the command, which may be indicative of the firmware latency. The elapsed time between the timestamps stored in columns "DMA Starts TS" 48 and "$1^{st}$ Data Frame TS" 50 may represent the amount of time between when the firmware began to execute the command and when the first data frame was received, which may indicate the latency in south controller 30. The elapsed time between the timestamps stored in columns "Last Data Frame TS" 52 and "Status TS" 54 may represent the amount of time between when the last data frame was received and when the status frame "Status TS" was sent, which may indicate latency in terminating the command.

Figure 4:
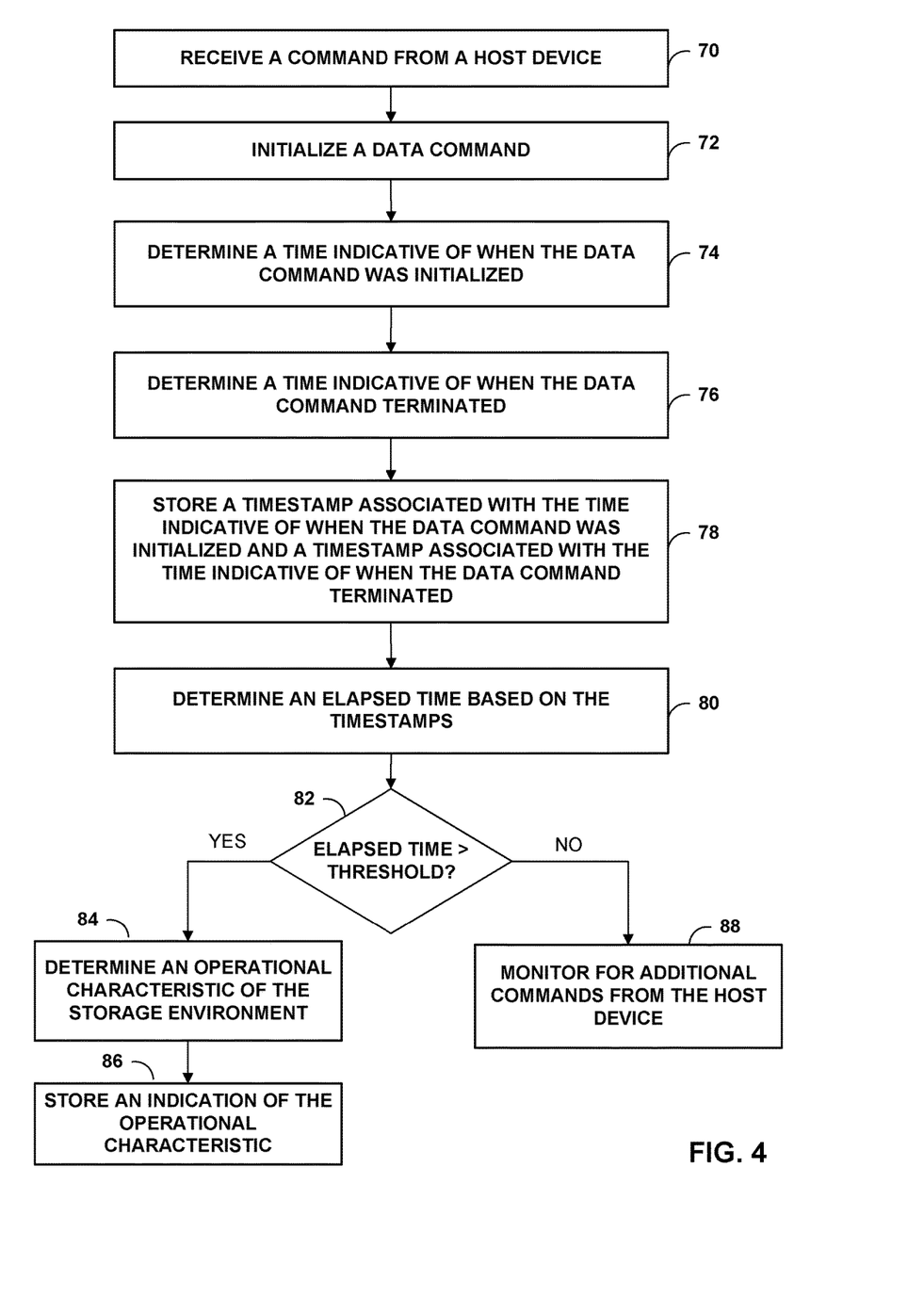
FIG. 4 is a flow diagram illustrating an example technique for measuring latency in a storage device, in accordance with one or more techniques of this disclosure.

FIG. 4 is a flow diagram illustrating an example technique for measuring latency in a storage device, in accordance with one or more techniques of this disclosure. For purposes of illustration, the exemplary technique illustrated in FIG. 3 will be described with respect to hardware controller 8 of FIG. 2. However, the techniques may be used with any combination of hardware or software.

In some examples, hardware controller 8 may receive a command (e.g., a read command or a write command) from host device 4 (70). In response to receiving the command, hardware controller 8 may initialize a data command (e.g., a data retrieval command or a data storage command) (72). For example, hardware controller 8 may perform protocol checks and assign a DMA engine to transfer data between host device 4 and cache 38. In examples where host device 4 sends a read command, north controller 20 may send a data retrieval command to south controller 30 such that south controller 30 may retrieve data from NVM 10 and store the data in cache 38. In examples where host device 4 sends a write command, north controller 20 may store the received data in cache 38 and send a data storage command to south controller 30 such that south controller 30 may retrieve the data from cache 38 and write the data to NVM 10.

Hardware controller 8 may determine a time indicative of when the data command (e.g., data retrieval command or data storage command) was initialized (74). For example, circuit logic 22 may determine a time at which controller 8 received the read or write command, a time at which controller 8 began to execute the data retrieval command or data storage command, and/or a time at which north controller 20 received a first data frame from NVM 10 or from host device 4. Hardware controller 8 may determine a time indicative of when the data command (e.g., data retrieval command or data storage command) terminated (76). For example, if north controller 20 initialized a data retrieval command, circuit logic 22 may determine a time at which north controller 20 received a last data frame from NVM 10 (via cache 38) or a time at which north controller 20 sent a status frame indicating whether the data transfer was successful. Likewise, if north controller 20 initialized a data storage command, circuit logic 22 may determine a time at which north controller 20 received a last data frame from host device 4 or a time at which north controller 20 sent a status frame indicating whether the data transfer was successful.

Hardware controller 8 may store a timestamp associated with the time indicative of when the data command (e.g., data retrieval command or data storage command) was initialized and a timestamp associated with the time indicative of when the data command terminated (78). For instance, circuit logic 22 may determine a timestamp associated with the time indicative of when the data retrieval command or data storage command was initialized and may store the timestamp to latency monitoring cache 24. Likewise, circuit logic 22 may determine a timestamp associated with the time indicative of when the data retrieval command or data storage command terminated and may store the timestamp to latency monitoring cache 24. In some examples, the timestamps may be recorded in increments between 10 nanoseconds to 10 microseconds.

In some examples, hardware controller 8 may determine an elapsed time based on the timestamps in latency monitoring cache 24 (80). Hardware controller 8 may determine whether the elapsed time is greater than a threshold amount of time (82). In some examples, the threshold amount of time may be 20 milliseconds. However, in other examples, the threshold amount of time may be selectable (i.e., the threshold amount of time may be set by a user).

Responsive to determining the elapsed time is greater than the threshold amount of time, hardware controller 8 may determine one or more operational characteristics of storage environment 2 (84). For example, hardware controller 8 may determine information about the controller register, firmware data structures, firmware event history, host configured mode settings, device state, and/or host command sequence and history. In some examples, hardware controller 8 may store the operational characteristics in a system area of NVM 10. Hardware controller 8 may store an indication of the one or more operational characteristics (86). For example, hardware controller may store information about the operational characteristics in a system area of NVM 10.

Responsive to determining that the elapsed time is not greater than the threshold amount of time, hardware controller 8 may monitor for additional read or write commands from host device 4. Hardware controller 8 may perform the example operations illustrated in FIG. 4 for each read or write command received from host device 4.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   receiving, by a hardware controller of a storage device and from a host device, a command to read data from a non-volatile memory device of the storage device;
   responsive to receiving the command:
   initializing, by firmware executing at a processor of the hardware controller, a data retrieval command to retrieve data from the non-volatile memory device;
   determining, by circuit logic of the hardware controller, a time indicative of when the firmware initialized the data retrieval command;
   determining, by the circuit logic, a time indicative of when the data retrieval command terminated;
   storing, by the circuit logic and at a latency monitoring cache located in the controller of the storage device, a timestamp associated with the time indicative of when the data retrieval command was initialized and a timestamp associated with the time indicative of when the data retrieval command terminated;
   responsive to determining that the data retrieval command terminated, copying, by the hardware controller, data from the latency monitoring cache to a volatile memory device;
   calculating a latency of the storage device;
   comparing the latency of the storage device to a threshold amount of time;
   responsive to the comparing the latency of the storage device to the threshold amount of time, and that the latency of the storage device exceeds the threshold amount of time, storing at least one operational characteristic of the storage device in a system area of the non-volatile memory of the storage device;
   responsive to the comparing the latency of the storage device to the threshold amount of time, and that the latency of the storage device does not exceed the threshold amount of time, monitoring, through the hardware controller, for an additional read command; and
   outputting the latency of the storage device with operational characteristics of the storage device to a user.

2. The method of claim 1, wherein determining the time indicative of when the firmware initialized the data retrieval command includes determining one of:
   a time at which the hardware controller received the command to read data,
   a time at when the firmware began to execute the data retrieval command, or
   a time at which the hardware controller received a first data frame from the non-volatile memory device, and
   wherein determining the time indicative of when the data retrieval command terminated includes determining one of:
   a time at which the hardware controller received a last data frame from the non-volatile memory device, or
   a time at which the hardware controller sent a status frame to the host device.

3. The method of claim 1, wherein the time indicative of when the firmware initialized the data retrieval command includes a time at which the hardware controller received the command to read data, the method further comprising:
   determining, by the circuit logic, a time at which the firmware began to execute the data retrieval command; and
   determining, by the circuit logic, a time at which the hardware controller received a first data frame from the non-volatile memory device.

4. The method of claim 1, wherein the time indicative of when the data retrieval command terminated includes the time when the hardware controller received a last data frame from the non-volatile memory device, the method further comprising:
determining, by the circuit logic, a time at which the hardware controller sent a status frame to the host device.

5. The method of claim 1, wherein the threshold time includes a selectable threshold time.

6. The method of claim 1, further comprising:
copying, by the hardware controller, data corresponding to the data copied to the volatile memory to a system area of the non-volatile memory.

7. The method of claim 1, further comprising:
responsive to copying data from the latency monitoring cache to the volatile memory device, updating, by the hardware controller, a data valid flag within the latency monitoring cache to indicate the data may be overwritten.

8. The method of claim 1, further comprising:
determining, by the circuit logic, a number of bursts needed to transfer the data from the non-volatile memory device to the data cache; and
storing, by the circuit logic and the latency monitoring cache, the number of bursts.

9. A data storage device comprising:
a non-volatile memory device; and
a hardware controller comprising a latency monitoring cache configured to store latency information, wherein the hardware controller is configured to:
receive, from a host device, a command to read data from the non-volatile memory device;
responsive to receiving the command:
determine a time indicative of initialing a data retrieval command to retrieve data from the non-volatile memory device;
determine a time indicative of terminating the data retrieval command;
store, to the latency monitoring cache, a timestamp associated with the time indicative of initializing the data retrieval command and a timestamp associated with the time indicative of terminating the data retrieval command; and
calculate a latency for the storage device;
comparing the latency of the storage device to a threshold amount of time and responsive to the comparing the latency of the storage device to the threshold amount of time, and that the latency of the storage device exceeds the threshold amount of time, storing at least one operational characteristic of the storage device in a system area of the non-volatile memory of the storage device;
responsive to the comparing the latency of the storage device to the threshold amount of time, and that the latency of the storage device does not exceed the threshold amount of time, monitoring, through the hardware controller, for an additional read command; and
output the latency for the storage device with operational characteristics of the storage device to a user.

10. The data storage device of claim 9, wherein the hardware controller comprises:
a processor configured to execute firmware that initializes the data retrieval command; and
circuit logic configured to:
determine the time indicative of initialing the data retrieval command;
determine the time indicative of terminating the data retrieval command; and
store the timestamp associated with the time indicative of initializing the data retrieval command and the timestamp associated with the time indicative of terminating the data retrieval command.

11. The data storage device of claim 9, wherein the hardware controller is configured to:
determine the time indicative of initialing the data retrieval command by determining a time at which the hardware controller:
receives the command to read data,
begins to execute the data retrieval command, or
receives a first data frame from the non-volatile memory device; and
determine the time indicative of terminating the data retrieval command by determining a time at which the controller:
receives a last data frame from the non-volatile memory device, or
sends a status frame to the host device.

12. The data storage device of claim 9, wherein the time indicative of initialing the data retrieval command includes a time at which the hardware controller receives the command to read data, wherein the hardware controller is further configured to:
determine a time at which the hardware controller begins to execute the data retrieval command; and
determine a time at which the hardware controller receives a first data frame from the non-volatile memory device.

13. The data storage device of claim 9, wherein the time indicative of terminating the data retrieval command includes a time at which the hardware controller receives a last data frame from the non-volatile memory device, wherein the hardware controller is further configured to:
determine a time at which the controller sends a status frame to host device.

14. The data storage device of claim 9, further comprising:
a volatile memory device, wherein the latency monitoring cache comprises a data valid flag, wherein responsive to determining the data retrieval command terminated, the hardware controller is further configured to:
copy data from the latency monitoring cache to the volatile memory device; and
update the data valid flag to indicate the data may be overwritten.

15. The data storage device of claim 14, wherein the hardware controller is further configured to:
copy, from the volatile memory to a system area of the non-volatile memory, data corresponding to the data copied to the volatile memory to be copied.

16. The data storage device of claim 9, further comprising:
a data cache, wherein the hardware controller is further configured to:
determine a number of bursts needed to transfer the data from the non-volatile memory device to the data cache; and
store, to the latency monitoring cache, the number of bursts.

17. A storage device comprising:
means for receiving, by a hardware controller of the storage device, a command to read data from a non-volatile memory device of the storage device;
means for initializing, by firmware executing at a processor of the hardware controller, a data retrieval command to retrieve data from the non-volatile memory device;
means for determining, by circuit logic of the hardware controller, a time indicative of when the firmware initialized the data retrieval command;
means for determining, by the circuit logic of the hardware, a time indicative of when the data retrieval command terminated;
means for storing, by the circuit logic, a timestamp associated with the time indicative of when the data retrieval command was initialized and a timestamp associated with the time indicative of when the data retrieval command terminated wherein the means for storing is in the hardware controller
means for determining that the data retrieval command terminated, copying, by the hardware controller, data from the latency monitoring cache to a volatile memory device;
means for calculating a latency of the storage device;
means for comparing the latency of the storage device to a threshold amount of time and responsive to the comparing the latency of the storage device to the threshold amount of time, and that the latency of the storage device exceeds the threshold amount of time, storing at least one operational characteristic of the storage device in a system area of the non-volatile memory of the storage device; and responsive to the comparing the latency of the storage device to the threshold amount of time, and that the latency of the storage device does not exceed the threshold amount of time, monitoring, through the hardware controller, for an additional read command; and
means for outputting the latency of the storage device with operational characteristics of the storage device to a user.

18. The storage device of claim 17, wherein the time indicative of when the firmware initialized the data retrieval command includes a time at which the hardware controller received the command to read data, wherein the time indicative of when the data retrieval command terminated includes a time at which the hardware controller received a last data frame from the non-volatile memory device, the storage device further comprising:
means for determining, by the circuit logic, a time at which the firmware began to execute the data retrieval command;
means for determining, by the circuit logic, a time at which the hardware began to execute the data retrieval command;
means for determining, by the circuit logic, a time at which the hardware controller sent a status frame to the host device.

19. A method comprising:
receiving, by a hardware controller of a storage device and from a host device, a command to write data to a non-volatile memory device of the storage device;
responsive to receiving the command:
initializing, by firmware executing at a processor of the hardware controller, a data storage command to store data to the non-volatile memory device;
determining, by circuit logic of the hardware controller, a time indicative of when the firmware initialized the data storage command;
determining, by the circuit logic, a time indicative of when the data storage command terminated; and
storing, by the circuit logic and at a latency monitoring cache in the controller of the storage device, a timestamp associated with the time indicative of when the data storage command was initiated and a timestamp associated with the time indicative of when the data storage command terminated;
responsive to determining that the data retrieval command terminated, copying, by the hardware controller, data from the latency monitoring cache to a volatile memory device;
calculating a latency of the storage device;
comparing the latency of the storage device to a threshold amount of time;
responsive to the comparing the latency of the storage device to the threshold amount of time, and that the latency of the storage device exceeds the threshold amount of time, storing at least one operational characteristic of the storage device in a system area of the non-volatile memory of the storage device;
responsive to the comparing the latency of the storage device to the threshold amount of time, and that the latency of the storage device does not exceed the threshold amount of time, monitoring, through the hardware controller, for an additional read command; and
outputting the latency of the storage device with operational characteristics of the storage device to a user.

20. The method of claim 19, wherein determining the time indicative of when the firmware initialized the data storage command includes determining one of:
a time at which the hardware controller received the command to store data,
a time at which the firmware began to execute the data storage command, or
a time at which the hardware controller received a first data frame from the host device, and
wherein determining the time indicative of when the data storage command terminated includes determining one of:
a time at which the hardware controller received a last data frame from the host device, or
a time at which the hardware controller sent a status frame to the host device.

21. The method of claim 19, further comprising:
determining, by the circuit logic, an elapsed time between the time indicative of when the firmware initialized the data storage command and the time indicative of when the data storage command terminated;
responsive to determining that the elapsed time is greater than a threshold time, determining, by the processor, at least one operational characteristic of the data storage device; and
storing, by the hardware controller and to a memory device, information indicative of the at least one operational characteristic.

22. The method of claim 19, further comprising:
responsive to determining that the data storage command terminated, copying by the hardware controller, data from the latency monitoring cache to a volatile memory device.

* * * * *